UNITED STATES PATENT OFFICE.

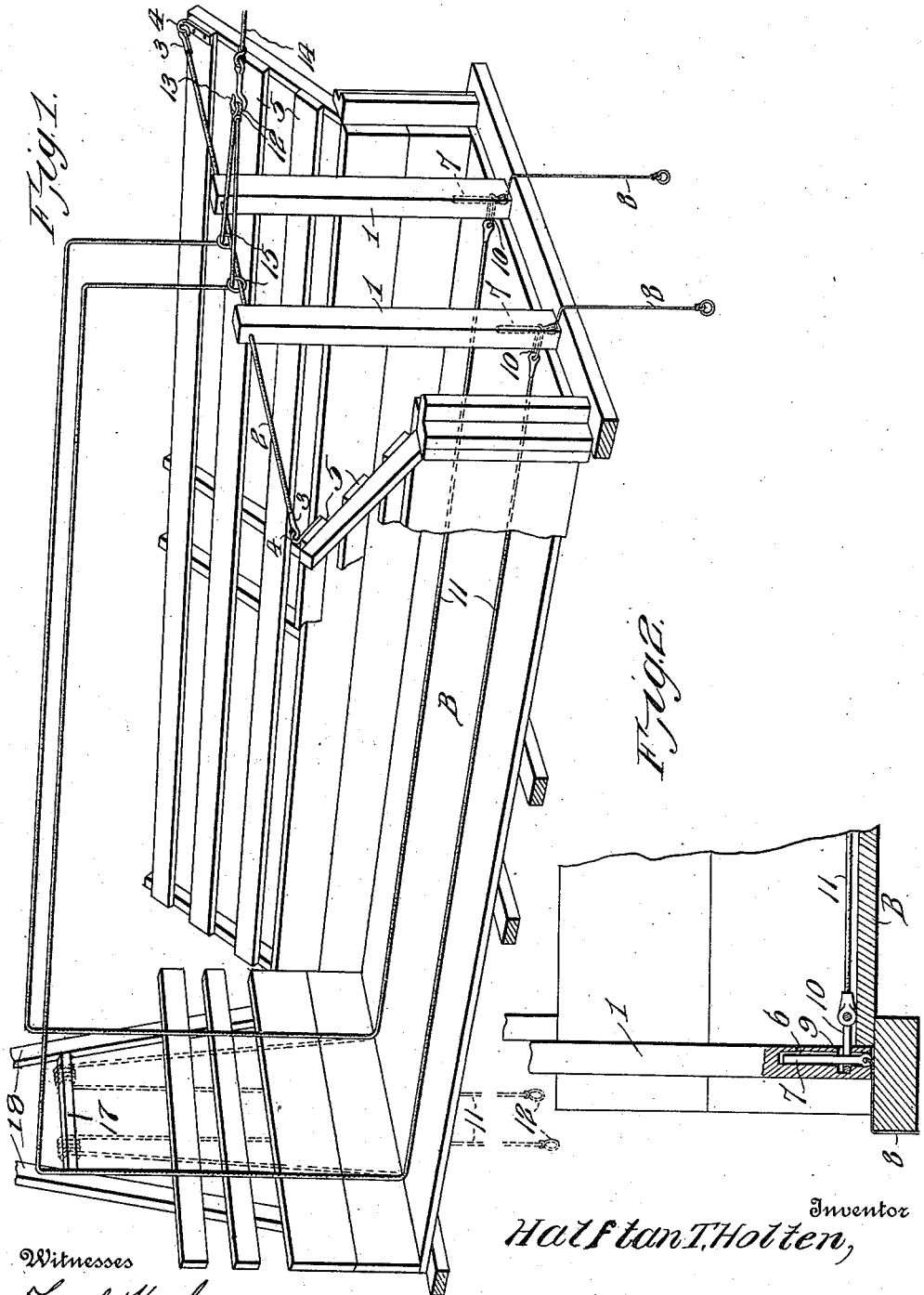

HALFTAN T. HOLTEN, OF MONTROSE, NORTH DAKOTA.

HAY-UNLOADER.

989,504.	Specification of Letters Patent.	Patented Apr. 11, 1911.

Application filed August 5, 1910. Serial No. 575,682.

*To all whom it may concern:*

Be it known that I, HALFTAN T. HOLTEN, a citizen of the United States of America, residing at Montrose, in the county of Williams and State of North Dakota, have invented new and useful Improvements in Hay-Unloaders, of which the following is a specification.

This invention relates to hay unloading devices and it has for its object to produce a device of simple and inexpensive construction, which may be readily used in connection with an ordinary hay rack or wagon for the purpose of discharging or unloading at one operation the entire load of hay from such rack or wagon and for the depositing of the same upon a stack.

With these and other ends in view, which will readily appear as the nature of the invention is better understood, the same consists in the improved construction and novel arrangement and combination of parts which will be hereinafter fully described and particularly pointed out in the claims.

In the accompanying drawings, Figure 1 is a perspective view, showing the improved unloading device applied to an ordinary hay rack. Fig. 2 is a sectional detail view taken through one of the bars or skids.

Corresponding parts in both figures are denoted by like characters of reference.

The improved unloading device includes in its construction a plurality of uprights 1 consisting of bars of suitable dimensions, which are connected adjacent to their upper ends by a flexible member 2 extending therethrough and provided at its ends with hooks, links, eyes or other suitable attaching means 3, adapted to be placed in temporary engagement with retaining links such as eyes 4, adjacent to the upper rear corners of the side boards 5 of a hay rack or wagon bed B. The bars or uprights may be thus temporarily supported in upright position adjacent to the tail-end of the wagon or hay rack, as shown in Fig. 1. The bars 1 are provided, adjacent to their lower ends, with recesses or sockets 6 for the reception of latch members 7, said latch members being provided with flexible trip members, such as cords 8, whereby they may be withdrawn from the sockets. The latch members 7 are adapted to be engaged by links or loops 10 at the ends of ropes, cables or other flexible members 11, constituting the sling, said links or loops being adapted to engage the pins or latch members 7 through slots or apertures 9, communicating with the sockets 6 in the bars 1; said ropes being provided adjacent to their opposite ends with loops 12 adapted to be connected with a hook 13 upon a hoisting member, such as a rope 14. The flexible supporting element 2 is provided, intermediate the bars 1, with rings or links 15 through which the looped ends 12 of the ropes 11 may be threaded.

In the operation of this device, after supporting the bars 1, 1 in upright position adjacent to the tail-end of the rack or wagon by means of the flexible supporting element 2, the links 10 of the ropes 11 are connected with the latch members 7 at the lower ends of the bars 1 and the ropes are then stretched lengthwise upon the bottom of the wagon bed and carried up and looped upon the cross bar 17 connecting the front stakes or uprights 18, where they are temporarily supported, as indicated in dotted lines in Fig. 1. The load may now be placed in the wagon, and after a full load has been gathered, the free ends of the ropes 11 are carried over the load and threaded through the ring 15, being temporarily made fast in any suitable convenient manner. The load will thus be securely held while it is being conveyed to the stack, the latch members 7 being retained in the socket 6 by friction due to the strain upon the sling ropes, and the vehicle is now backed up against the end of the stack, and the hoisting rope 14 is connected with the loops 12 of the sling ropes. The hoisting rope is carried over the stack and by applying draft the load will first be gradually compressed in the direction of the tail-end of the wagon; the members 3, 4 are now disconnected, thus casting off the flexible member 2, after which the entire load being now formed into a compact bundle confined by the ropes 11 and the bars 1 will be dragged up the end of the stack and to the top where it may be discharged at any desired point by operating the trip members 8 to withdraw the latch members 7, thereby releasing the links 10. The bars 1, which are obviously lifted, together with the load, constitute runners which slide upon the stack, thus facilitating the movement of the load over the rough body of the stack to the point where it is to be discharged.

The improved unloading device, as will be seen from the foregoing description, is very simple in construction, and it has been found thoroughly efficient for the purpose for which it is provided.

Having thus described the invention, what I claim as new, is:—

1. An unloading device comprising a plurality of bars, a flexible member connecting the upper ends of the bars and having attaching means at the ends thereof, links upon the flexible connection member, latch members engaging the lower ends of the bars, sling ropes having links engaging the latch members, said ropes being provided adjacent to their opposite ends with loops threaded through the links upon the flexible supporting member, and a hoisting element connected with said loops.

2. In a device of the character described, a plurality of bars provided adjacent to their lower ends with sockets and slots communicating with the sockets, latch members engaging said sockets, a flexible member extending through the upper ends of the bars and connecting the same, said flexible member being provided with attaching means at the ends thereof and with guiding means intermediate its ends, and flexible sling members, each provided adjacent to one end with latch engaging means, the opposite ends of said sling ropes being threaded through the guiding means upon the flexible supporting member, and provided with terminal loops.

In testimony whereof I affix my signature in presence of two witnesses.

HALFTAN T. HOLTEN.

Witnesses:
E. E. ELLIS,
NILS HOLTAN.

---

Copies of this patent may be obtained for five cents each, by addressing the "Commissioner of Patents, Washington, D. C."